No. 714,453. Patented Nov. 25, 1902.
W. B. COLLINS.
CAR FENDER.
(Application filed May 10, 1902.)
(No Model.) 2 Sheets—Sheet 1.
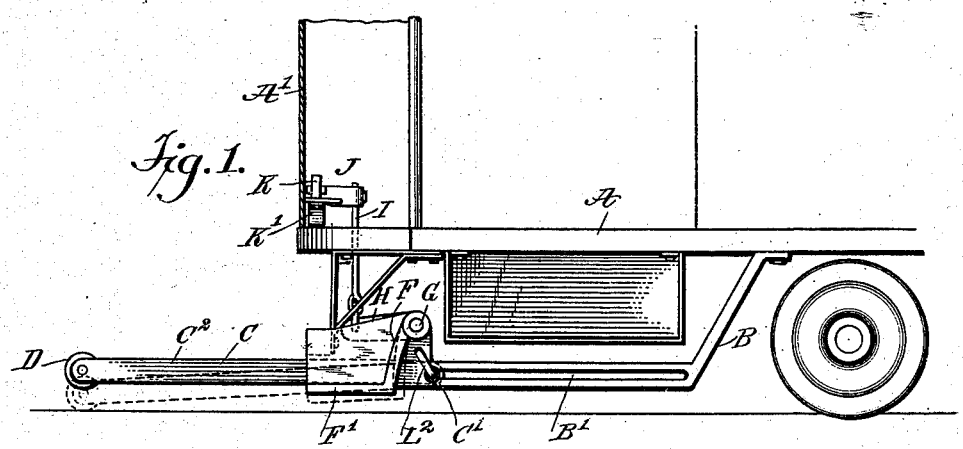
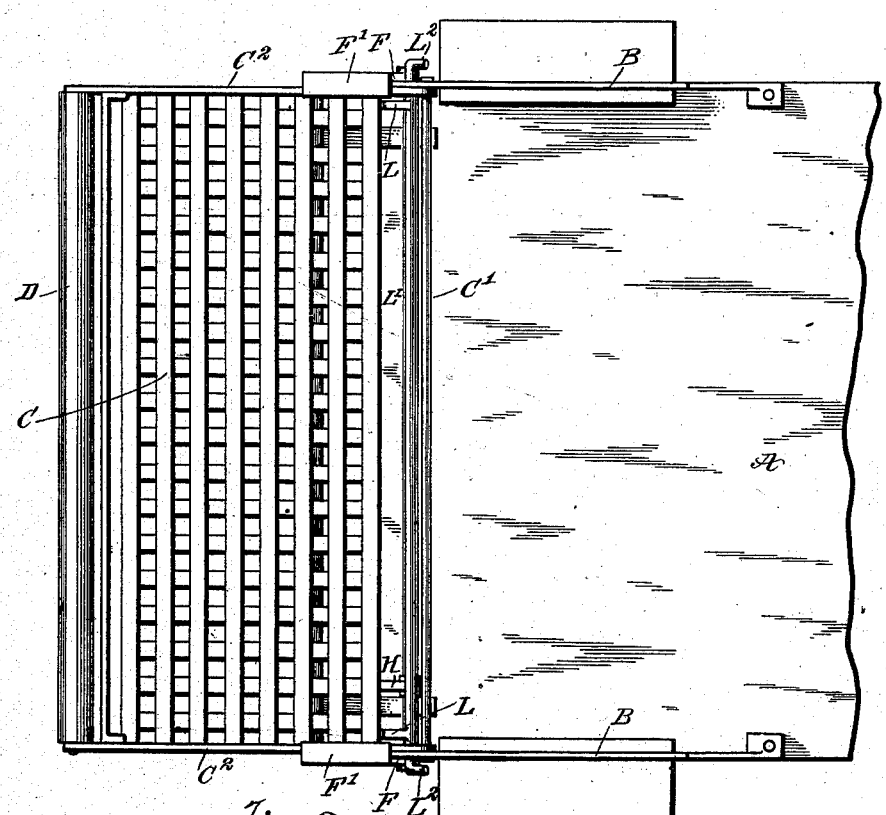
WITNESSES:
INVENTOR
William B. Collins
BY
ATTORNEYS.

No. 714,453. Patented Nov. 25, 1902.
W. B. COLLINS.
CAR FENDER.
(Application filed May 10, 1902.)
(No Model.) 2 Sheets—Sheet 2.

WITNESSES:

INVENTOR
William B. Collins
BY
ATTORNEYS.

THE NORRIS PETERS CO., PHOTO-LITHO., WASHINGTON, D. C.

UNITED STATES PATENT OFFICE.

WILLIAM B. COLLINS, OF NORTH DARTMOUTH, MASSACHUSETTS.

CAR-FENDER.

SPECIFICATION forming part of Letters Patent No. 714,453, dated November 25, 1902.

Application filed May 10, 1902. Serial No. 106,708. (No model.)

*To all whom it may concern:*

Be it known that I, WILLIAM B. COLLINS, a citizen of the United States, and a resident of North Dartmouth, in the county of Bristol and State of Massachusetts, have invented a new and Improved Car-Fender, of which the following is a full, clear, and exact description.

The object of the invention is to provide a new and improved car-fender which is simple and durable in construction, normally in position a distance above the track to readily clear switches and the like, forming part of the road equipment, the car-fender being adapted to be moved suddenly into an active position in case of an emergency at the will of the motorman or other car attendant to cause the fender to safely pick up any obstacle that may be in the path of the car.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 3:
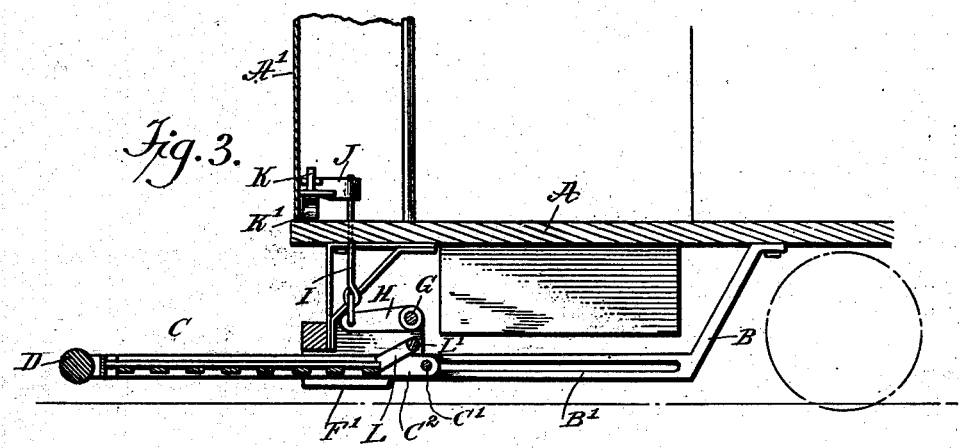
Figure 4:
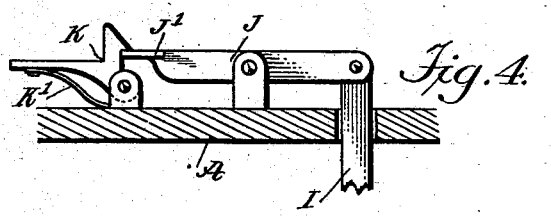
Figure 5:
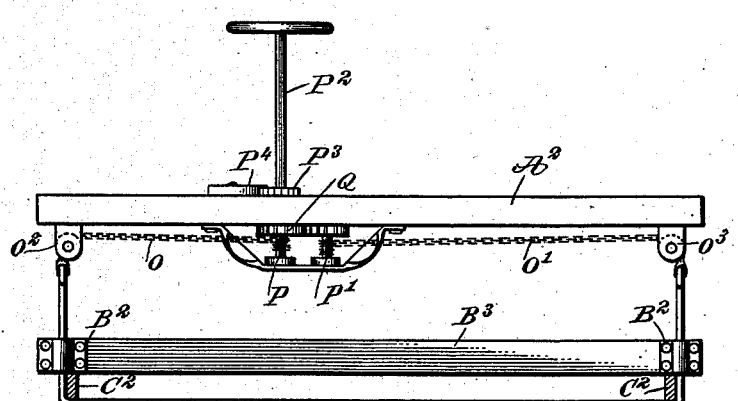

Figure 1 is a side elevation of the improvement as applied, showing the fender in an extended but inactive position. Fig. 2 is an inverted plan view of the same. Fig. 3 is a longitudinal sectional elevation of the same. Fig. 4 is an enlarged cross-section of the car-platform, showing the locking and releasing device under the control of the motorman or car attendant; and Fig. 5 is a cross-section of the car-fender held in an uppermost position by a locking and releasing device of a modified form.

On the under side of the platform A of the car are secured the longitudinally-extending brackets B, having elongated slots B', engaged by the pivot C' of the fender proper, C, the said pivot C' being secured in the side rails C² of the fender C at the rear end thereof, so that when the fender C is in a forward position, as shown in Figs. 1, 2, and 3, then the fender can swing into a lowermost position, as indicated in dotted lines in Fig. 1 and as hereinafter more fully described.

On the forward ends of the side rails C² of the fender C is journaled a roller D, adapted to travel on the track at the time the fender is swung into a lowermost position, it being understood, however, that the fender C normally stands in an inactive position a suitable distance above the track, as indicated in full lines in Figs. 1 and 3, to allow the fender to readily clear switches and like devices forming part of the permanent equipment of the road over which the car travels.

The under sides of the side rails C² of the fender C are adapted to be engaged by flanges F', extending transversely from the free ends of arms F, secured to as haft G, journaled in suitable bearings in the brackets B, and on the said shaft G is secured a link-arm H, connected by a link I with a lever J, fulcrumed on the top of the platform A, adjacent to the dashboard A', as plainly illustrated in the drawings, the said lever J having a footpiece J', adapted to be engaged and pressed by the operator's foot to impart a swinging motion to the lever J, to move the link I upward, to cause a turning of the shaft G and an upward and forward swinging of the arms F, to firmly engage the flanges F' with the side rails C², to swing the fender C into a normal horizontal position, as shown in full lines in Fig. 1.

In order to hold the lever J in the position referred to, a catch K is provided, fulcrumed on the platform A and pressed on by a spring K' to hold the catch normally in engagement with the footpiece J' after the latter is pressed downward by the operator for the purpose above explained.

Now in the case of an obstacle being in the path of the car the motorman or other attendant thereof presses the spring-catch K with the foot to disengage the catch from the lever J to unlock the latter, and consequently the link I, link-arm H, and shaft G, to allow the arms F to swing downward by their own weight and that of the fender C, so that the latter swings into a lowermost position—that is, until the roller D rests on the track and travels on the same during the further forward movement of the car. Now the obstacle in the path of the car when struck by the roller D readily passes onto the fender C and is thus not liable to be run over by the car and injured.

When it is desired to swing the fender C back into an uppermost horizontal inactive position, it is only necessary for the operator to bear down on the footpiece J' of the lever J until the spring-catch K can engage the said footpiece.

The fender on the rear end of the car is moved under the platform A, so as to be completely out of the way of following vehicles, it being understood that the fender can be readily slid rearwardly, as the pivot C' is free to travel in the slots B' of the brackets B, and the side rails C² of the fender slide on top of the flanges F'.

In order to hold the fender C against accidental rearward movement when the fender is to be used as above described, I provide locking-catches L, adapted to engage the rear end of the fender C, as plainly indicated in Fig. 3, the said catches L being in the shape of arms attached to a transverse shaft L', mounted to turn and to slide laterally in bearings on the brackets B, directly below the shaft G, the outer ends of the said shaft L' being provided with handles L² (see Figs. 1 and 2) to be taken hold of by the operator to swing the catches L in or out of engagement with the rear edge of the fender C. When the catches L are swung upward out of engagement with the fender C, then the operator by moving the shaft L' transversely causes one of the catches to rest on the corresponding side rail C², so that the fender can readily move rearwardly under the platform A for the purpose previously explained.

It is understood that the flanges F' and their arms F and shaft G form a supporting device for the fender C; but this arrangement may be varied, as shown, for instance, in Fig. 5, in which the side rails C² of the fender rest on a U-shaped bar N, having its vertical arms mounted to slide in bearings B², carried by the brackets B³, attached to the under side of the platform A². The upper ends of the U-shaped bar N are connected with chains O O', extending transversely and passing over pulleys O² O³, arranged on the under side of the platform A², and the said chains wind on drums P P', connected with each other by gear-wheels Q, so that the drums rotate in unison and impart a uniform up-and-down sliding movement to the bar N for swinging the rails C² of the fender upward or allowing the same to swing downward for the purpose previously mentioned. The drum P is provided with a staff P² under the control of the operator, and on the said staff is secured a ratchet-wheel P³, engaged by a foot-pawl P⁴ under the control of the operator, to lock the staff and drums against return movement while the fender C is in a normal uppermost position, as previously explained.

When it is desired to release the fender, the operator simply disengages the foot-pawl P⁴ from the ratchet-wheel P³ to allow the fender to swing downward by its own weight, as the bar N is then released and slides downward with the fender.

Having thus described my invention, I claim as new and desire to secure by Letters Patent—

1. A car-fender, having a fender proper mounted to swing, a supporting device engaging the fender, forward of its fulcrum, to hold the fender normally above the track in an inactive position, said supporting device including a pair of arms having transverse flanges, a holding device for holding the supporting device in an uppermost position, and a locking and releasing device for the said holding device, to normally lock the holding device in position and to allow of releasing the said holding device and the supporting device, to permit the fender to swing downward by its own weight, as set forth.

2. A car-fender having longitudinal guideways secured to the under side of the car-platform; a fender mounted to swing and to travel back and forth upon said guideways; a supporting device engaging the fender to hold it normally above the track in an inactive position; means under the control of the operator for holding and releasing said supporting device; a transverse bar mounted on said guideways for longitudinal and rotatable movement thereon, and having arms adapted when in one position to engage the fender to lock it against rearward sliding movement and when in another position to engage it in a way to permit such movement, as specified and for the purpose set forth.

3. A car-fender having longitudinally-extending slotted brackets secured to the under side of the car-platform, a fender having a rear pivot mounted to turn and to slide in the slots of the said brackets, a supporting device engaging the fender, forward of the said pivot, to hold the fender normally above the track in an inactive position, means for holding and releasing the said supporting device, the said means being under the control of the operator, and a transverse shaft having arms for engaging the fender at the rear end thereof, to hold the fender against rearward movement on the said brackets and the said supporting device, as set forth.

4. A car-fender having longitudinally-extending slotted brackets secured to the under side of the car-platform, a fender having a rear pivot mounted to turn and to slide in the slots of the said brackets, a supporting device engaging the fender, forward of the said pivot, to hold the fender normally above the track in an inactive position, means for holding and releasing the said supporting device, the said means being under the control of the operator, and a transverse shaft having arms for engaging the fender at the rear end thereof, to hold the fender against rearward movement on the said brackets and the said supporting device, the said shaft being mounted to turn and to slide transversely in the said brackets, as set forth.

5. A car-fender, having longitudinally-extending brackets on the under side of the car, a fender having a rear pivot mounted to turn and to slide in the said brackets, a transverse shaft journaled in the brackets, arms on the said shaft, provided with flanges adapted to engage the under side of the sides of the fender, a link-arm on the said shaft, a lever fulcrumed on the car-platform, a link connecting the link-arm with the said lever, and a spring-catch under the control of the operator, for engaging and locking the said lever, as set forth.

6. A car-fender having longitudinally-extending slotted brackets secured to the under side of the car-platform; a fender proper having a rear pivot mounted to turn and to slide in the slots of said brackets; a supporting device engaging the fender forward of the said pivot to hold the fender normally above the track in an inactive position; a holding device for said supporting device; and a latch, having a hook portion for engaging said holding device, and a foot-lever for disengaging the same, and a spring engaging the foot-lever to hold the latch normally in position to be engaged by the holding device as specified and set forth.

7. A car-fender having a fender proper mounted to swing; slotted brackets for supporting said fender, upward extensions at the forward ends of said brackets; a transverse bar carried by said extensions; arms rigid with said bar and having transverse flanges engaging the fender; a crank rigidly secured to said bar for operating said flanged arms, and a holding device engaging said crank to hold the fender normally above the track; and a locking and releasing device for said holding device to normally lock the holding device in position and to allow of releasing the same to permit the fender to swing downwardly by gravity as set forth.

8. A car-fender having longitudinally-extending slotted brackets, secured to the under side of the car-platform, a fender having a rear pivot mounted to turn and to slide in the slots of said brackets, a supporting device engaging the fender, forward of the said pivot to hold the fender normally above the track in an inactive position, and means under the control of the operator for holding and releasing the said supporting device; a transverse bar mounted to turn and to slide laterally in bearings on the slotted brackets; catches on said bar for engaging the rear edge of the fender and handles for operating said bars as specified and for the purpose set forth.

9. A car-fender having longitudinally-slotted brackets, secured to the under side of the car-platform; a fender proper having a rear pivot mounted to turn and to slide in the slots of said brackets; a supporting device engaging the fender, forward of the said pivot, to hold the fender normally above the track in an inactive position, said supporting device consisting of a transverse bar journaled at the front end of the slotted brackets; arms rigidly secured to said bar and having transverse flanges to engage the fender; and a rigid crank on said bar to be engaged by the locking devices; means for holding and releasing said supporting device the said means being under the control of the operator, and means for holding the fender against rearward sliding movement as set forth.

10. A car-fender having longitudinal guideways, secured to the under side of the car-platform, a fender mounted to swing and to travel back and forth upon said guideways; a transverse bar pivoted to the front end of the guideways; arms rigidly secured to said bar and having transverse flanges for engaging the fender and holding it normally in an inactive position, a crank-arm rigidly secured to said bar; a foot-lever on top of the car-platform; a post extending upwardly from the platform to form a fulcrum for said lever; a link extending upwardly from the said crank-arm to one end of said foot-lever and a latch on top of the platform for engaging the foot-lever when the fender is elevated to its normal position by said lever, said latch also having a lever designed to be operated by the foot of the motorman to release the foot-lever, as specified and for the purpose set forth.

In testimony whereof I have signed my name to this specification in the presence of two subscribing witnesses.

WILLIAM B. COLLINS.

Witnesses:
   THEO. G. HOSTER,
   EVERARD BOLTON MARSHALL.